United States Patent
Kim et al.

(10) Patent No.: US 10,355,272 B2
(45) Date of Patent: Jul. 16, 2019

(54) ANODE ACTIVE MATERIAL FOR LITHIUM SECONDARY BATTERY AND METHOD OF PREPARING THE SAME

(71) Applicant: LG Chem, Ltd., Seoul (KR)

(72) Inventors: Hyun Chul Kim, Daejeon (KR); Yong Ju Lee, Daejeon (KR); Eun Kyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 13 days.

(21) Appl. No.: 14/437,127

(22) PCT Filed: Oct. 31, 2014

(86) PCT No.: PCT/KR2014/010352
§ 371 (c)(1),
(2) Date: Apr. 20, 2015

(87) PCT Pub. No.: WO2015/065095
PCT Pub. Date: May 7, 2015

(65) Prior Publication Data
US 2016/0028085 A1 Jan. 28, 2016

(30) Foreign Application Priority Data

Oct. 31, 2013 (KR) .................. 10-2013-0131827
Oct. 31, 2014 (KR) .................. 10-2014-0149928

(51) Int. Cl.
*H01M 4/48* (2010.01)
*H01M 4/13* (2010.01)
(Continued)

(52) U.S. Cl.
CPC ............. *H01M 4/48* (2013.01); *C01B 33/023* (2013.01); *H01M 4/13* (2013.01); *H01M 4/364* (2013.01);
(Continued)

(58) Field of Classification Search
CPC ............. H01M 4/386; H01M 10/0525; H01M 2220/30; H01M 4/48; H01M 4/134; H01M 4/364; Y02E 60/122; C01B 33/023
See application file for complete search history.

(56) References Cited

U.S. PATENT DOCUMENTS

2003/0215711 A1 11/2003 Aramata et al.
2004/0115535 A1* 6/2004 Morita .................. H01M 4/364
429/231.8
(Continued)

FOREIGN PATENT DOCUMENTS

CN  102983313 A  3/2013
EP  2372816 A1  10/2011
(Continued)

OTHER PUBLICATIONS

Chang, Won-Seok, et al. "Quartz (SiO 2): a new energy storage anode material for Li-ion batteries." Energy & Environmental Science 5.5 (2012): 6895-6899.*
(Continued)

*Primary Examiner* — Sarah A. Slifka
*Assistant Examiner* — Brian R Ohara
(74) *Attorney, Agent, or Firm* — Lerner, David, Littenberg, Krumholz & Mentlik, LLP

(57) ABSTRACT

Provided are an anode active material for a lithium secondary battery including a silicon-based composite formed of silicon (Si) and crystalline $SiO_2$, wherein the Si and crystalline $SiO_2$ are in the form of grains, a method of preparing the same, and a lithium secondary battery including the anode active material.

Since an anode active material according to an embodiment of the present invention includes a silicon-based composite including Si and $SiO_2$ in a grain state and the $SiO_2$ is crystalline $SiO_2$, the reaction between amorphous $SiO_2$ and lithium in an electrolyte may be excluded. Thus, since the
(Continued)

crystalline $SiO_2$ is included in the silicon-based composite, excellent capacity characteristics of a secondary battery may be maintained and initial efficiency and life characteristics may be improved when the silicon-based composite is used as an anode active material.

15 Claims, 4 Drawing Sheets

(51) Int. Cl.
*H01M 4/36* (2006.01)
*H01M 4/38* (2006.01)
*H01M 10/0525* (2010.01)
*H01M 10/052* (2010.01)
*C01B 33/023* (2006.01)

(52) U.S. Cl.
CPC .......... *H01M 4/386* (2013.01); *H01M 4/483* (2013.01); *H01M 10/0525* (2013.01); *H01M 10/052* (2013.01); *H01M 2220/30* (2013.01)

(56) References Cited

U.S. PATENT DOCUMENTS

| | | | |
|---|---|---|---|
| 2006/0068287 A1 | 3/2006 | Morita et al. | |
| 2006/0134518 A1* | 6/2006 | Kogetsu | H01M 4/0426 429/218.1 |
| 2009/0010833 A1 | 1/2009 | Rosenband et al. | |
| 2009/0029256 A1 | 1/2009 | Mah et al. | |
| 2009/0136847 A1 | 5/2009 | Jeong et al. | |
| 2009/0162750 A1 | 6/2009 | Kawakami et al. | |
| 2010/0092856 A1 | 4/2010 | Hirose et al. | |
| 2011/0111294 A1* | 5/2011 | Lopez | H01M 4/134 429/217 |
| 2011/0244333 A1* | 10/2011 | Kawada | H01M 4/131 429/231.8 |
| 2011/0269022 A1* | 11/2011 | Kawakami | H01M 4/136 429/221 |
| 2012/0141872 A1 | 6/2012 | Kim et al. | |
| 2012/0181477 A1 | 7/2012 | Kanno et al. | |
| 2013/0189575 A1 | 7/2013 | Anguchamy et al. | |
| 2013/0280614 A1 | 10/2013 | Lee et al. | |
| 2014/0030597 A1 | 1/2014 | Jung et al. | |
| 2014/0158986 A1* | 6/2014 | Leung | B82Y 10/00 257/26 |
| 2014/0220347 A1 | 8/2014 | Dehtiar et al. | |
| 2015/0325839 A1* | 11/2015 | Put | H01M 4/134 429/231.4 |

FOREIGN PATENT DOCUMENTS

| | | |
|---|---|---|
| JP | 2006092969 A | 4/2006 |
| JP | 2009032693 A | 2/2009 |
| JP | 2009164104 A | 7/2009 |
| JP | 2009252579 A | 10/2009 |
| JP | 2010170943 A | 8/2010 |
| JP | 2014026950 A | 2/2014 |
| KR | 20030075132 A | 9/2003 |
| KR | 20040082876 A | 9/2004 |
| KR | 100898293 B1 | 5/2009 |
| KR | 2012-0059993 A | 6/2012 |
| KR | 20120062920 A | 6/2012 |
| KR | 20120120034 A | 11/2012 |
| KR | 20130118191 A | 10/2013 |
| TW | 201316597 A | 4/2013 |

OTHER PUBLICATIONS

Haiping Jia et al: "Novel Three-Dimensional Mesoporous Silicon for High Power Lithium Ion Battery Anode Material", Advanced Energy Materials, vol. 1, No. 6, Nov. 6, 2011, pp. 1036-1039, XP055196786.
Jung-In Lee et al:"Highly stable Si-based multicomponent anodes for practical use in lithium-ion batteries", Energy & Environmental Science, vol. 5, No. 7, May 3, 2012, p. 7878, XP055196738.
Hua-Chao Tao et al: "Interweaved Si@SiOx/C nanoporous spheres as anode materials for Li-ion batteries", Solid State Ionics, vol. 220, Jun. 18, 2012, pp. 1-6, XP055196761.
Extended European Search Report for Application No. 14853184.1 dated Jul. 2, 2015.
International Search Report for Application No. PCT/KR2014/010352 dated Jan. 28, 2015.
Mamiya, et al., Preparation of fine silicon particles from amorphous silicon monoxide by the disproportionation reaction, Journal of Crystal Growth, Jul. 2001, pp. 457-461, vol. 229, Issues 1-4.

* cited by examiner

US 10,355,272 B2

ANODE ACTIVE MATERIAL FOR LITHIUM SECONDARY BATTERY AND METHOD OF PREPARING THE SAME

CROSS-REFERENCE TO RELATED APPLICATIONS

The present application is a national phase entry under 35 U.S.C. § 371 of International Application No. PCT/KR2014/010352 filed Oct. 31, 2014, which claims priority from Korean Application No. 10-2013-0131827 filed Oct. 31, 2013 and Korean Application No. 10-2014-0149928 filed Oct. 31, 2014, all of which are hereby incorporated herein by reference.

TECHNICAL FIELD

The present invention relates to an anode active material for a lithium secondary battery, a method of preparing the same, and a lithium secondary battery including the anode active material.

BACKGROUND ART

Lithium secondary batteries, which have been in the spotlight as a power source of portable and small electronic devices, may exhibit high discharge voltages that are two times or more than those of batteries using a typical alkaline aqueous solution by using an organic electrolyte solution. Thus, the lithium secondary batteries exhibit high energy density.

Oxides formed of lithium and transition metal which have a structure capable of intercalating lithium, such as $LiCoO_2$, $LiMn_2O_4$, and $LiNi_{1-x}Co_xO_2$ ($0<x<1$), have been mainly used as a cathode active material of a lithium secondary battery, and various types of carbon-based materials including artificial graphite, natural graphite, and hard carbon, which are capable of intercalating and deintercalating lithium, have been used as an anode active material.

Graphite is mainly used as an anode material of the lithium secondary battery. However, graphite has a low capacity per unit mass of 372 mAh/g and a high-capacity lithium secondary battery may be difficult to be prepared by using graphite.

As an anode material exhibiting higher capacity than graphite, a material forming an intermetallic compound with lithium, such as silicon, tin, and an oxide thereof, may be promising. However, volumes of the above materials may expand because crystal structures thereof may be changed when absorbing and storing lithium. When silicon absorbs and stores the maximum amount of lithium, the silicon may be transformed into $Li_{4.4}Si$ and the volume of $Li_{4.4}Si$ may expand due to charging. With respect to the rate of increase in volume due to the charging, the volume may expand up to about 4.12 times the volume of the silicon before the volume expansion.

Therefore, a significant amount of research into an increase in the capacity of an anode material, such as silicon, i.e., a decrease in a volume expansion coefficient by alloying of silicon, has been conducted. However, since a metal, such as silicon (Si), tin (Sn), and aluminum (Al), is alloyed with lithium during charge and discharge, volume expansion and contraction may occur. Thus, cycle characteristics of the battery may degrade.

Since higher capacity characteristics than those of a carbon-based material may be obtained and volume expansion may be suppressed in comparison to Si when a non-carbon-based material, such as SiO, is used, a great deal of research into the non-carbon-based material has been conducted. However, since a reaction between lithium (Li) and oxygen (O) forming by-products is represented by an irreversible reaction, initial efficiency may be decreased.

Therefore, a significant amount of research into SiO has been conducted to improve the above-described limitations. For example, Korean Patent Application No. 2012-7011002 discloses an anode active material for a lithium ion secondary battery using $SiO_x$. However, it has limitations in that charge and discharge cycle characteristics may not be sufficiently improved and an x value in SiO, may be difficult to be controlled by a conventional synthesis method.

DISCLOSURE OF THE INVENTION

Technical Problem

The present invention provides an anode active material for a lithium secondary battery which may improve initial efficiency and life characteristics of a lithium secondary battery, and a method of preparing the same.

Technical Solution

According to an aspect of the present invention, there is provided an anode active material including a silicon-based composite formed of silicon (Si) and crystalline $SiO_2$, wherein the $SiO_2$ is in the form of grains.

According to another aspect of the present invention, there is provided a method of preparing an anode active material including preparing a silicon-based composite by reducing crystalline $SiO_2$.

According to another aspect of the present invention, there is provided a lithium secondary battery including the anode active material prepared by the above preparation method.

Advantageous Effects

Since an anode active material according to an embodiment of the present invention includes a silicon-based composite including Si and $SiO_2$ in a grain state and the $SiO_2$ is crystalline $SiO_2$, the reaction between amorphous $SiO_2$ and lithium in an electrolyte may be excluded. Thus, since the crystalline $SiO_2$ is included in the silicon-based composite, excellent capacity characteristics of a secondary battery may be maintained and initial efficiency and life characteristics may be improved when the silicon-based composite is used as an anode active material.

MODE FOR CARRYING OUT THE INVENTION

Figure 1:
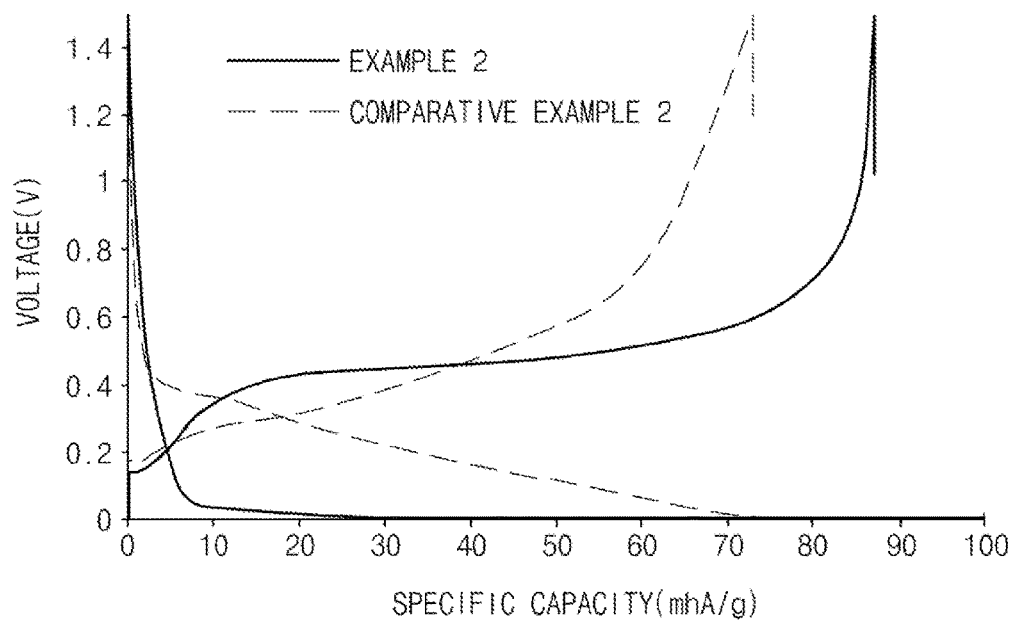
FIG. 1 is a graph illustrating specific capacities of Example 2 and Comparative Example 2 according to an embodiment of the present invention.

Hereinafter, the present invention will be described in more detail.

A carbon-based material has been mainly used as an anode active material of a lithium secondary battery, but the carbon-based material has limitations in capacity characteristics such as discharge capacity. Accordingly, high-capacity materials using a silicon-based anode active material have recently been studied as a material of an anode active material of a lithium secondary battery. Since the silicon-based anode active material has a capacity (3,600 mAh/g) about 10 times or more higher than a theoretical capacity (372 mAh/g) of a carbon-based anode active material, the silicon-based anode active material is in the spotlight as a material for a high-capacity lithium secondary battery.

However, with respect to the silicon-based material, since cracking of particles and chemical pulverization may easily occur due to large changes in volume (swelling) during charge and discharge, life characteristics may be rapidly decreased.

In order to address the above limitations, different from a silicon-based anode active material including only silicon (Si), a silicon-based composite has been developed in which Si and $SiO_2$ are present in a separated state in a particle. However, since a typical silicon-based composite includes Si grains and amorphous $SiO_2$ grains, there have been limitations, for example, the formation of by-products, such as $Li_2O$, due to the reaction between amorphous $SiO_2$ and lithium included in an electrolyte, and furthermore, the reduction of initial discharge capacity and initial efficiency due to the by-products.

In contrast, an embodiment of the present invention provides a silicon-based composite comprising Si and crystalline $SiO_2$ in a grain state and an anode active material comprising the silicon-based composite.

The crystalline $SiO_2$ may be quartz, cristobalite, or tridymite. This, as the same component as $SiO_2$ before thermal reduction using a metal reducing agent to be later described, corresponds to $SiO_2$ that is not reduced by thermal reduction.

The silicon-based composite may include Si grains and crystalline $SiO_2$ grains in a ratio of $1-(x/2):(x/2)$, and in this case, an overall composition of the silicon-based composite may be represented by $SiO_x (0<x<2)$. That is, x is the number ratio of oxygen (O) atoms to Si atoms included in the silicon-based composite, wherein x may satisfy $0<x<2$. $SiO_x$ prepared according to an embodiment of the present invention may minimize changes in initial efficiency according to the number ratio of oxygen atoms. However, in the case that x is greater than 2, the swelling phenomenon of the anode active material may be decreased to some extent, but initial discharge capacity of the lithium secondary battery may be reduced. In addition, in the silicon-based composite according to the embodiment of the present invention, the number ratio may satisfy $0<x<1$.

As described above, the silicon-based composite according to the embodiment of the present invention may include Si and crystalline $SiO_2$ grains.

In the case that the silicon-based composite is used as an anode active material, lithium ions deintercalated from a cathode active material are stored and released so that the Si may substantially cause an electrochemical reaction. The Si may be crystalline or amorphous. The reason for this is that, in the case that crystalline $SiO_2$ is reduced by thermal reduction using metallic gas to be described later, the Si may be reduced to grains of crystalline Si or may be reduced to gains of amorphous Si.

In the case that Si present in the silicon-based composite is amorphous, the expression "amorphous" may be construed as a meaning including the case of no crystallinity as well as all cases excluding the meaning of theoretical "crystallinity".

In the case in which the Si included in the silicon-based composite is crystalline, an average particle size of the crystalline Si is 500 nm or less, may be 300 nm or less, and for example, may be in a range of 0.05 nm to 100 nm. In this case, the crystal size may be measured by X-ray diffraction (XRD) analysis or an electron microscope (e.g., scanning electron microscope (SEM) and transmission electron microscope (TEM)).

Si particles generally used may accompany very complex crystal changes in reactions which electrochemically absorb, store, and release lithium atoms. Composition and crystal structure of the silicon particles change to Si (crystal structure: Fd3m), LiSi (crystal structure: I41/a), $Li_2Si$ (crystal structure: C2/m), $Li_7Si_2$ (Pbam), and $Li_{22}Si_5$ (F23) as the reactions, which electrochemically absorb, store, and release lithium atoms, proceed. Also, a volume of the silicon particle expands to about 4 times according to the complex changes in the crystal structure. However, since the reaction between the silicon-based composite according to the embodiment of the present invention and lithium atoms may be performed while maintaining the structure of the silicon-based composite.

An average particle diameter of the anode active material may be in a range of 0.1 μm to 20 μm, and for example, may be in a range of 0.5 μm to 10 μm. In the case that the particle diameter of the anode active material is less than 0.1 μm, an electrode plate density may decrease, and in the case in which the particle diameter of the anode active material is greater than 20 μm, rate capability may be reduced or life characteristics may be decreased due to volume expansion.

The present invention also provides a method of preparing the above-described anode active material. The preparation method according to an embodiment of the present invention may include preparing a silicon-based composite by reducing crystalline $SiO_2$. Since the silicon-based composite formed of Si and crystalline $SiO_2$ is prepared by reducing the crystalline $SiO_2$, reaction by-products, such as $Li_2O$, are not formed by preventing the reaction between amorphous $SiO_2$ and lithium. Thus, initial discharge capacity, initial efficiency, and life characteristics may be improved.

A type of the metal reducing agent is not particularly limited as long as it has sufficient reducing power for separating/extracting oxygen from the above-described $SiO_2$, and for example, the metal reducing agent may be one selected from the group consisting of titanium (Ti), aluminum (Al), magnesium (Mg), and calcium (Ca), or a mixture of two or more thereof.

The reducing of the crystalline $SiO_2$ may be performed by including a process of thermally reducing the crystalline $SiO_2$ using metallic powder or metallic gas including a metal reducing agent in an inert atmosphere. Since oxygen of the crystalline $SiO_2$ is locally removed by the thermal reduction, local reduction may occur. That is, a portion of the crystalline $SiO_2$ from which oxygen is removed is reduced to Si, and as a result, a silicon-based composite may be prepared in which Si and unreduced remaining crystalline $SiO_2$ grains are included in the form of a composite. As described above, the Si may be crystalline, may be amorphous, or may be a mixture in which crystalline and amorphous Si are included.

Figure 2:
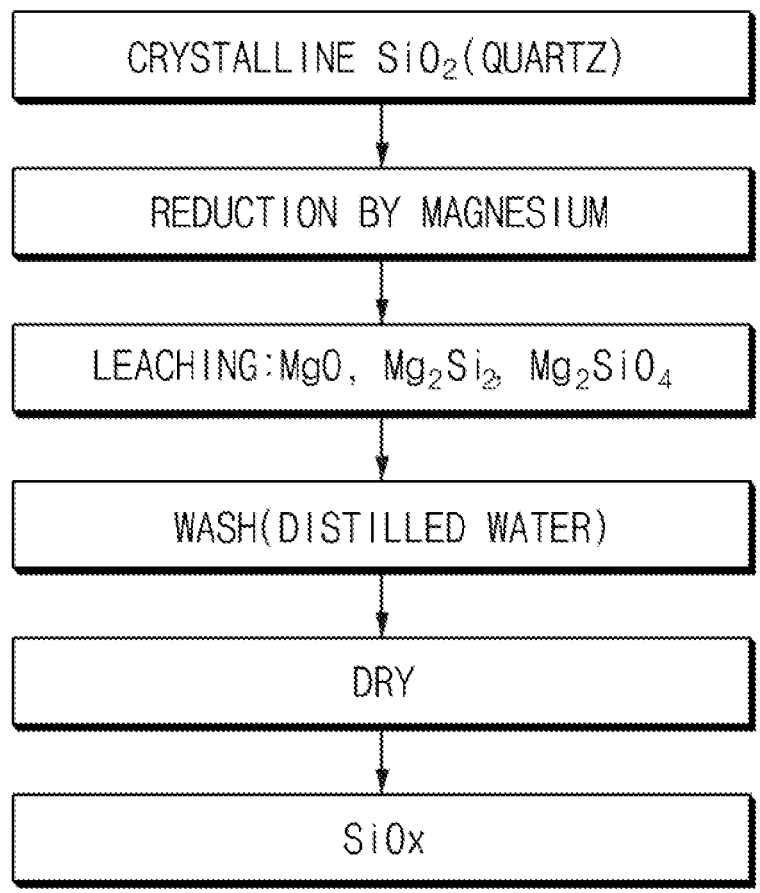
FIG. 2 illustrates a method of preparing a silicon-based composite according to an embodiment of the present invention.

As illustrated in FIG. 2, the preparation method according to the embodiment of the present invention may include thermally reducing the crystalline $SiO_2$ with metallic powder including the metal reducing agent. That is, the thermal reduction may be performed by reducing a mixture, in which crystalline $SiO_2$ and metallic powder including a metal reducing agent, e.g., Mg, are mixed, in a reaction furnace, for example, a rotary kiln, in order to minimize contact between the crystalline $SiO_2$ and Mg as the metal reducing agent and maintain a uniform reaction.

Herein, $SiO_2$, as a raw material, may be quartz, cristobalite, or tridymite.

Also, an amount of the metal reducing agent included in the metallic powder may be in a range of 100:0.1 to 100:100 as a molar ratio based on the $SiO_2$ as a raw material. The larger the amount of the metal reducing agent is, the more the $SiO_2$ may be reduced. Thus, the ratio of Si to crystalline $SiO_2$ grains included in the prepared silicon-based composite may be easily controlled by controlling the amount of the metallic powder used in the thermal reduction.

According to an embodiment of the present invention, the metallic gas may include Mg as the metal reducing agent. Accordingly, a stoichiometric reaction between the crystalline $SiO_2$ and Mg as the metal reducing agent is as follows:

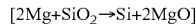

$$[2Mg+SiO_2 \rightarrow Si+2MgO]$$

Furthermore, other metallic reducing agents in addition to Mg may be used as the reducing agent, and in this case, the reduction of the crystalline $SiO_2$ occurs by a reaction similar to the above reaction formula.

The thermal reduction may be performed in a temperature range of 400° C. to 1,000° C. for 1 hour to 24 hours. In the case that the temperature of the thermal reduction is less than 400° C., the reduction reaction may be difficult to occur, and in the case in which the temperature of the thermal reduction is greater than 1,000° C., crystallinity of the crystalline $SiO_2$ may be changed. Also, in the case that the time of the thermal reduction is less than 1 hour, the reduction reaction may not be completely finished, and in the case in which the time of the thermal reduction is greater than 24 hours, the efficiency of the preparation process may be reduced.

Also, the thermal reduction may be performed while flowing inert gas, and the inert gas usable in this case may be one selected from the group consisting of argon (Ar), nitrogen ($N_2$), neon (Ne), helium (He), and krypton (Kr), or mixed gas of two or more thereof.

Thereafter, leaching by-products generated during the thermal reduction process may be further performed. Examples of by-products, which may be generated when the metal reducing agent is magnesium, may include MgO, $Mg_2Si$, or $Mg_2SiO_4$. Specifically, according to an embodiment of the present invention, the silicon-based composite is prepared and reduced impurities may then be removed using an HCl aqueous solution. An amount of HCl used in the removal of the impurities may be in a range of 0.1 N to 10 N. In the case that the amount of HCl used is less than 0.1 N, the impurities may not be completely removed, and in the case in which the amount of HCl used is greater than 10 N, problems may occur in the manufacturing process.

A product having the by-products removed therefrom is collected, and a silicon-based composite including desired Si and crystalline $SiO_2$ may then be obtained by washing and drying.

According to another embodiment of the present invention, the thermal reduction may be performed in such a manner that the metallic reducing agent is formed in a gas state and the crystalline $SiO_2$ may be reduced with the metallic gas that is mixed with the inert gas.

According to another embodiment of the present invention, provided is an anode including a current collector and an anode active material that is prepared by the above preparation method and formed on at least one surface of the current collector.

The anode, for example, is prepared by coating the anode collector with a mixture of the anode active material, a conductive agent, and a binder, and then drying the anode collector. The anode may also be prepared by a preparation method typically used in the art. For example, the anode active material according to the embodiment of the present invention is mixed with a binder, a solvent, and a conductive agent and a dispersant if necessary, and stirred to prepare a slurry. Then, a current collector may be coated with the slurry and pressed to prepare the anode.

According to another embodiment of the present invention, a lithium secondary battery including the anode active material prepared by the above preparation method is provided.

The lithium secondary battery includes a cathode including a cathode active material; a separator; an anode including the anode active material; and an electrolyte, and the anode active material may be prepared as the anode. For example, the anode active material according to the embodiment of the present invention is mixed with a binder, a solvent, and a conductive agent and a dispersant if necessary, and stirred to prepare a slurry. Then, a current collector may be coated with the slurry and pressed to prepare the anode.

Examples of the binder may be a vinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluoro rubber, or various copolymers.

N-methyl-2-pyrrolidone, acetone, or water may be used as the solvent.

The conductive agent is not particularly limited so long as it does not generate chemical changes in the battery as well as having conductivity. Examples of the conductive agent may be graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; and a conductive material such as a polyphenylene derivative.

An aqueous-based dispersant or an organic dispersant, such as N-methyl-2-pyrrolidone, may be used as the dispersant.

Similar to the preparation of the anode, a cathode active material, a conductive agent, a binder, and a solvent are mixed to prepare a slurry, and then a cathode may be prepared by directly coating a metal current collector with the slurry or by casting the slurry on a separate support and laminating a cathode active material film separated from the support on a metal current collector.

Examples of the cathode active material may be a layered compound, such as lithium cobalt oxide ($LiCoO_2$) or lithium nickel oxide ($LiNiO_2$), or a compound substituted with at least one transition metal; lithium manganese oxides such as the chemical formula $Li_{1+y}Mn_{2-y}O_4$ (where y ranges from 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; nickel (Ni)-site type lithium nickel oxide expressed by the chemical formula of $LiNi_{1-x}M_yO_2$ (where M is cobalt (Co), manganese (Mn), Al, copper (Cu), iron (Fe), Mg, boron (B), or gallium (Ga), and y ranges from 0.01 to 0.3); lithium manganese complex oxide expressed by the chemical formula of $LiMn_{2-y}M_yO_2$ (where M is Co, Ni, Fe, chromium (Cr), zinc (Zn), or tantalum (Ta), and y ranges from 0.01 to 0.1) or $Li_2Mn_3MO_8$ (where M is Fe, Co, Ni, Cu, or Zn); and $LiMn_2O_4$ having a part of lithium (Li) being substituted with alkaline earth metal ions. However, the cathode active material is not limited thereto.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or by being laminated as the separator. A typical porous nonwoven fabric, for example, a nonwoven fabric formed of high melting point glass fibers or polyethylene terephthalate fibers may be used. However, the separator is not limited thereto.

In an electrolyte used in an embodiment of the present invention, a lithium salt, which may be included as the electrolyte, may be used without limitation so long as it is typically used in an electrolyte for a secondary battery. For example, one selected from the group consisting of $F^-$, $Cl^-$, $I^-$, $NO_3^-$, $N(CN)_2^-$, $BF_4^-$, $ClO_4^-$, $PF_6^-$, $(C^F_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_3)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte used in the present invention, an organic solvent included in the electrolyte may be used without limitation so long as it is typically used, and typically, at least one selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran may be used.

In particular, ethylene carbonate and propylene carbonate, ring-type carbonates among the carbonate-based organic solvents, well dissociate the lithium salt in the electrolyte due to high dielectric constants as high-viscosity organic solvents, and thus, the ring-type carbonate may be used. Since an electrolyte having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate, for example, may be used.

Selectively, the electrolyte stored according to an embodiment of the present invention may further include an additive, such as an overcharge inhibitor, included in a typical electrolyte.

A separator is disposed between the cathode and the anode to form a battery structure, the battery structure is wound or folded to put in a cylindrical battery case or prismatic battery case, and then a secondary battery is completed when the electrolyte is injected thereinto. Also, the battery structure is stacked in a bi-cell structure, impregnated with the electrolyte, and a secondary battery is then completed when the product thus obtained is put in a pouch and sealed.

Hereinafter, the present invention will be described in more detail. However, the following examples are merely provided to allow for a clearer understanding of the present invention, rather than to limit the scope thereof.

<Preparation of Silicon-Based Composite>

EXAMPLE 1

Figure 4:
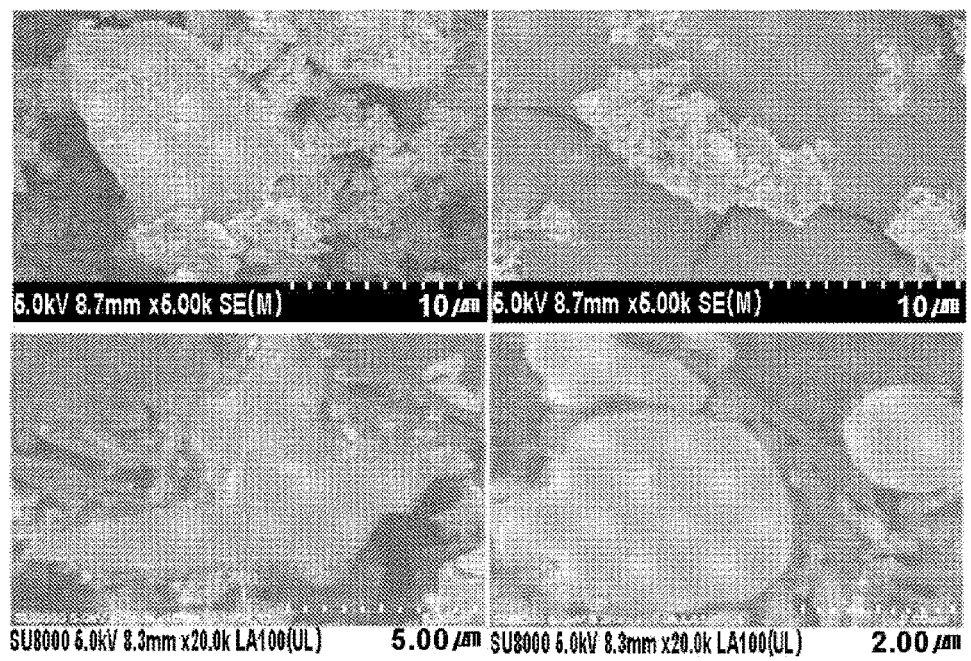
FIG. 4 is scanning electron microscope (SEM) images of Example 1 according to an embodiment of the present invention.

100 g of crystalline $SiO_2$ powder and 41 g of Mg powder as a metal reducing agent were mixed and then put in a reaction vessel of a thermal reduction chamber. Subsequently, the temperature of the chamber was increased to 570° C. Thereafter, Ar was used as an inert gas, and Ar was supplied at a flow rate of about 800 sccm. Also, the reaction was performed using a rotary kiln as the reaction vessel. The thermal reduction reaction was performed for 8 hours, and after 8 hours, the chamber temperature was decreased to room temperature. A product in the reaction vessel was collected to prepare a silicon-based composite. Reduced MgO or the like was removed from the prepared silicon-based composite using HCl (1N). In this case, scanning electron microscope (hereinafter, referred to as "SEM") images of the prepared silicon-based composite are presented in FIG. 4.

COMPARATIVE EXAMPLE 1

A silicon-based composite was prepared in the same manner as in Example 1 except that amorphous $SiO_2$ was thermally reduced.

<Preparation of Coin-type Half Cell>

EXAMPLE 2

The silicon-based composite prepared in Example 1 as an anode active material, acetylene black as a conductive agent, and polyvinylidene fluoride as a binder were mixed at a weight ratio of 95:1:4 and the mixture was mixed with a N-methyl-2-pyrrolidone solvent to prepare a slurry. One surface of a copper current collector was coated with the prepared slurry to a thickness of 30 μm, dried and rolled. Then, an anode was prepared by punching into a predetermined size.

10 wt % fluoroethylene carbonate based on a total weight of an electrolyte solution was added to a mixed solvent, which includes 1.0 M $LiPF_6$ and an organic solvent prepared by mixing ethylene carbonate and diethyl carbonate at a weight ratio of 30:70, to prepare an non-aqueous electrolyte solution.

A lithium foil was used as a counter electrode, a polyolefin separator was disposed between both electrodes, and a coin-type half cell was then prepared by injecting the electrolyte solution.

COMPARATIVE EXAMPLE 2

A coin-type half cell was prepared in the same manner as in Example 2 except that the silicon-based composite prepared in Comparative Example 1 was used as an anode active material.

EXPERIMENTAL EXAMPLE 1: Initial Efficiency Measurement

In order to investigate initial discharge capacities of the coin-type half cells prepared in Example 2 and Comparative Example 2, the coin-type half cells were charged at 0.1 C to a voltage of 4.2 V under constant current/constant voltage (CC/CV) conditions and charged to a current of 0.005 C under a constant current (CC) condition at 25° C. in the first cycle. After the coin-type half cells were left standing for 30 minutes, initial discharge capacities were measured by discharging the cells at 0.1 C to a voltage of 3 V.

Also, in order to investigate initial efficiencies of the coin-type half cells prepared in Example 2 and Comparative Example 2, the coin-type half cells prepared in Example 2 and Comparative Example 2 were charged at 0.1 C to a voltage of 5 mV and charged to a current of 0.005 C at 5 mV under constant current/constant voltage (CC/CV) conditions at 23° C., and then discharged at 0.1 C to a voltage of 1.5 V under a constant current (CC) condition to measure initial efficiencies.

The results of the initial discharge capacities and initial efficiencies measured by the above methods are presented in Table 1 below.

TABLE 1

|  | Initial discharge capacity (mAh/g) | Initial efficiency (%) |
| --- | --- | --- |
| Example | 1,600 | 89 |
| Comparative Example | 1,600 | 74 |

As illustrated in Table 1, according to the results of measuring the efficiencies of the example and comparative example, the initial efficiency of the example, in which the silicon-based composite was prepared by reducing crystalline $SiO_2$, was significantly improved, and it was confirmed that since the silicon-based composite formed of Si and crystalline $SiO_2$ was prepared by reducing crystalline $SiO_2$ the initial efficiency was improved by preventing the reaction between amorphous $SiO_2$ and lithium as well as the formation of by-products such as $Li_2O$.

EXPERIMENTAL EXAMPLE 2: Voltage Profile Measurement

The results of measuring voltage profiles of the coin-type half cells prepared in Example 2 and Comparative Example 2 in a range of 0 V to 1.4 V are presented in FIG. 1. Referring to FIG. 1, it may be confirmed that the half cell of Example 2 not only had a more uniform voltage profile than the half cell of Comparative Example 2, but also had higher initial capacity. In particular, it was understood that the discharge capacity of the battery, which may be utilized near 0.4 V, was increased by about 2 times.

EXPERIMENTAL EXAMPLE 3: X-Ray Diffraction (XRD) Analysis

Figure 3:
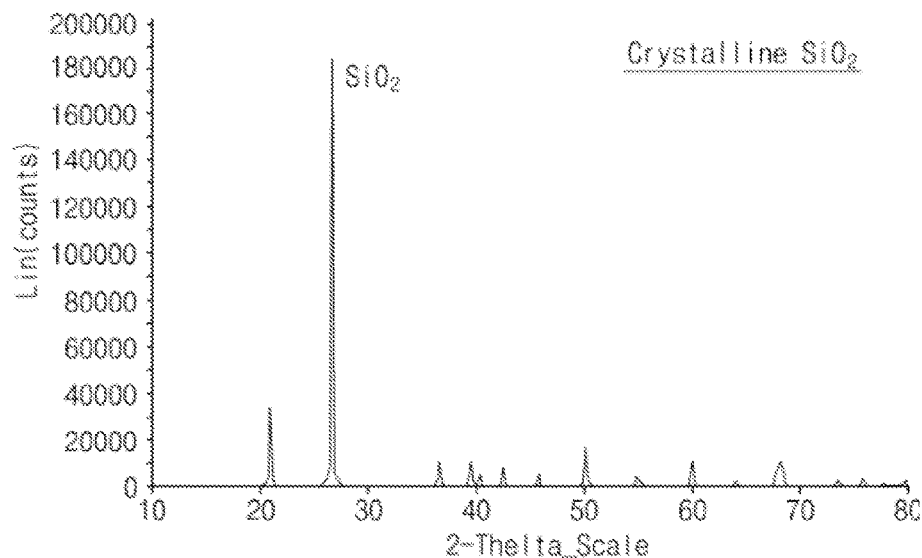
FIG. 3 is the results of X-ray diffraction (XRD) analysis on crystalline $SiO_2$ and a silicon-based composite of Example 1 according to an embodiment of the present invention.
Figure 3:
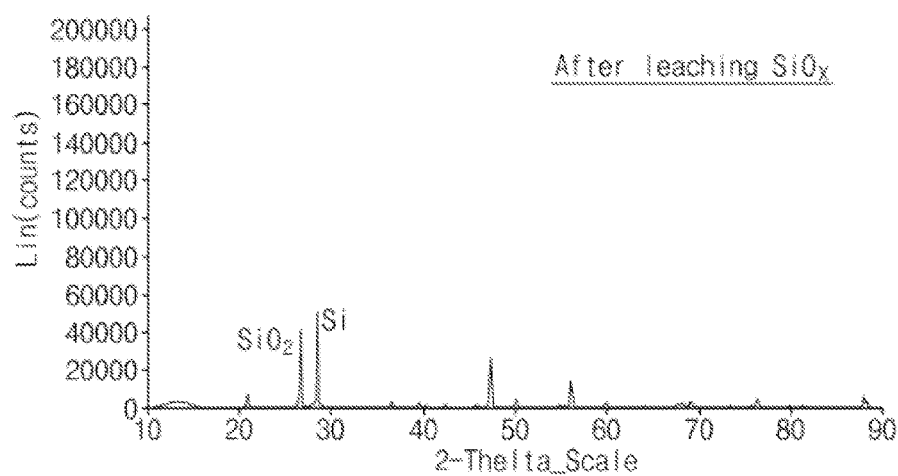

X-ay diffraction peaks were obtained from crystalline $SiO_2$ and the silicon-based composite of Example 1, and the structures thereof were analyzed. The results thereof are presented in FIG. 3. Referring to FIG. 3, it may be confirmed that a Si peak was observed in the XDR graph of the silicon-based composite of Example 1 prepared by the preparation method according to the embodiment of the present invention.

While the present invention has been particularly shown and described with reference to preferred embodiments thereof, it will be understood by those skilled in the art that various modifications and variations may be made therein without departing from the spirit and scope of the invention as defined by the appended claims. Thus, the invention is intended to cover all modifications, equivalents, and alternatives falling within the scope of the invention as defined by the appended claims.

The invention claimed is:

1. An anode active material, consisting of
   a silicon-based composite particle consisting of crystalline silicon (Si) and crystalline $SiO_2$,
   wherein the crystalline $SiO_2$ and Si are in a form of grains,
   wherein the silicon-based composite is represented by $SiO_x(0<x<2)$, and
   wherein the Si and crystalline $SiO_2$ grains are present in a ratio of $1-(x/2):(x/2)$, and
   wherein an average diameter of the silicon-based composite particle is in a range of 0.5 to 20 μm.

2. The anode active material of claim 1, wherein the crystalline $SiO_2$ is quartz, cristobalite, or tridymite.

3. The anode active material of claim 1, wherein an average particle diameter of the crystalline Si is in a range of 0.05 nm to 100 nm.

4. A method of preparing an anode active material, comprising:
   reducing crystalline $SiO_2$ to prepare the anode active material,
   wherein the anode active material consists of a silicon-based composite particle consisting of crystalline silicon (Si) and crystalline $SiO_2$,
   wherein the crystalline $SiO_2$ and Si are in a form of grains,
   wherein the silicon-based composite is represented by $SiO_x(0<x<2)$, and
   wherein the Si and crystalline $SiO_2$ grains are present in a ratio of $1-(x/2):(x/2)$, and
   wherein an average diameter of the silicon-based composite particle is in a range of 0.5 to 20 μm.

5. The method of claim 4, wherein the reducing of the crystalline $SiO_2$ is performed by thermally reducing the crystalline $SiO_2$ with metallic powder or metallic gas including a metal reducing agent in an inert atmosphere.

6. The method of claim 4, wherein the reducing of the crystalline $SiO_2$ is performed by mixing the crystalline $SiO_2$ with metallic powder including a metal reducing agent and thermally reducing the mixture in a temperature range of 400° C. to 1,000° C. for 1 hour to 24 hours in an inert atmosphere.

7. The method of claim 5, wherein the metal reducing agent comprises at least one selected from the group consisting of titanium (Ti), aluminum (Al), magnesium (Mg), and calcium (Ca).

8. The method of claim 5, wherein an amount of the metal reducing agent included in the metallic powder is in a range of 100:0.1 to 100:100 as a molar ratio based on the crystalline $SiO_2$.

9. The method of claim 4, wherein the reducing of the crystalline $SiO_2$ is performed by thermally reducing in a rotary kiln.

10. The method of claim 4, further comprising removing reduced impurities using an HCl aqueous solution after the preparation of the silicon-based composite.

11. The method of claim 10, wherein the reduced impurities comprise MgO.

12. An anode comprising a current collector and the anode active material of claim 1 formed on at least one surface of the current collector.

13. A lithium secondary battery comprising the anode active material of claim 1.

14. The anode active material of claim 1, wherein the silicon-based composite is represented by $SiO_x(0<x<1)$.

15. The anode active material of claim 1, wherein an average particle diameter of the crystalline Si is in a range of 100 nm to 500 nm.

\* \* \* \* \*